United States Patent

[11] 3,602,148

| [72] | Inventor | Horace M. Swartz |
| | | Doylestown, Pa. |
| [21] | Appl. No. | 796,676 |
| [22] | Filed | Feb. 5, 1969 |
| [45] | Patented | Aug. 31, 1971 |
| [73] | Assignee | FMC Corporation |
| | | San Jose, Calif. |

[54] CONVEYING APPARATUS
8 Claims, 11 Drawing Figs.
[52] U.S. Cl. .................................................. 104/96, 104/172
[51] Int. Cl. ..........................................B65g 17/42, B61j 3/04
[50] Field of Search............................. 104/172 S, 196

[56] References Cited
UNITED STATES PATENTS
| 3,196,805 | 7/1965 | Bishop et al. .................. | 104/172 |
| 3,314,378 | 4/1967 | Potter et al. .................. | 104/96 |
| 3,420,188 | 1/1969 | Dehne et al. .................. | 104/172 |
| 3,451,352 | 6/1969 | Curry et al. ................... | 104/172 |
| 2,883,942 | 4/1959 | Johnson ....................... | 104/172 |

Primary Examiner—Arthur L. La Point
Assistant Examiner—Robert Saifer
Attorneys—F. W. Anderson and C. E. Tripp ABSTRACT: A conveyor trolley for use in a conveyor system of the type referred to as "power and free systems" is provided with a driving pawl and a backup pawl at its forward end, and means for lowering both pawls as the trolley is moved through a transfer station from a powered main line to a powdered, secondary storage or processing line. The trolley is also provided with a normally inactive dog on its rearward end that is raised only at the transfer station into the path of the pushers of the main line so that, when the driving pawl on the front of the trolley has been diverted onto a secondary line and moved out of contact with the pusher on the main line, the next pusher on the main line will engage the raised dog and positively move the trolley through the transfer station and onto the secondary line.

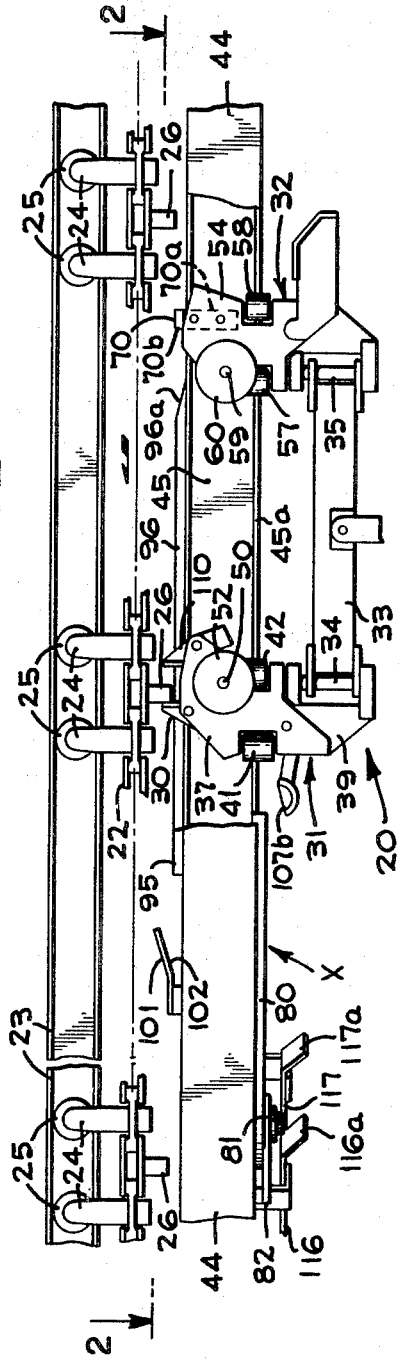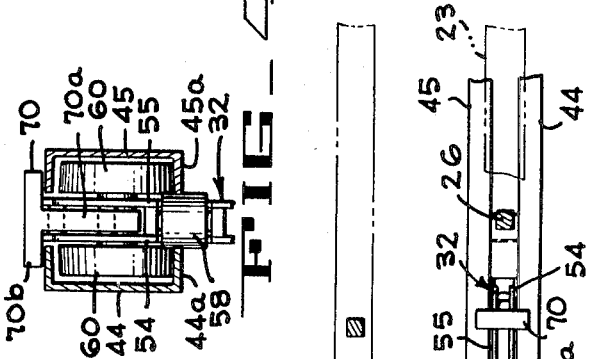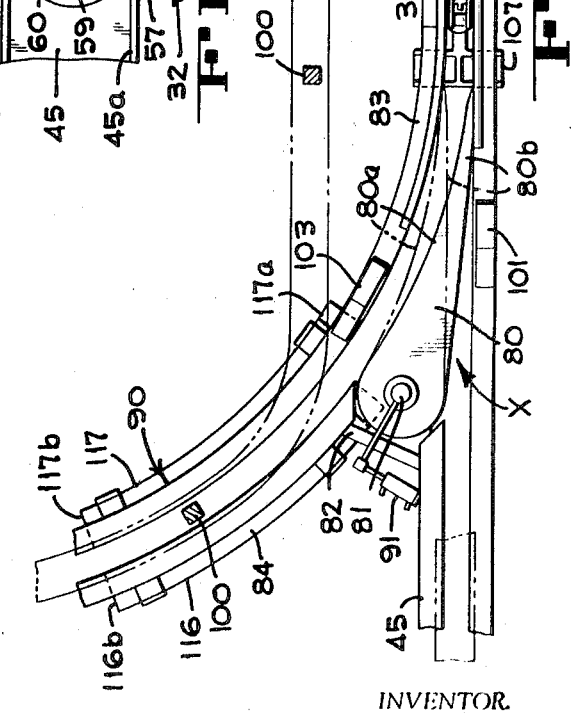

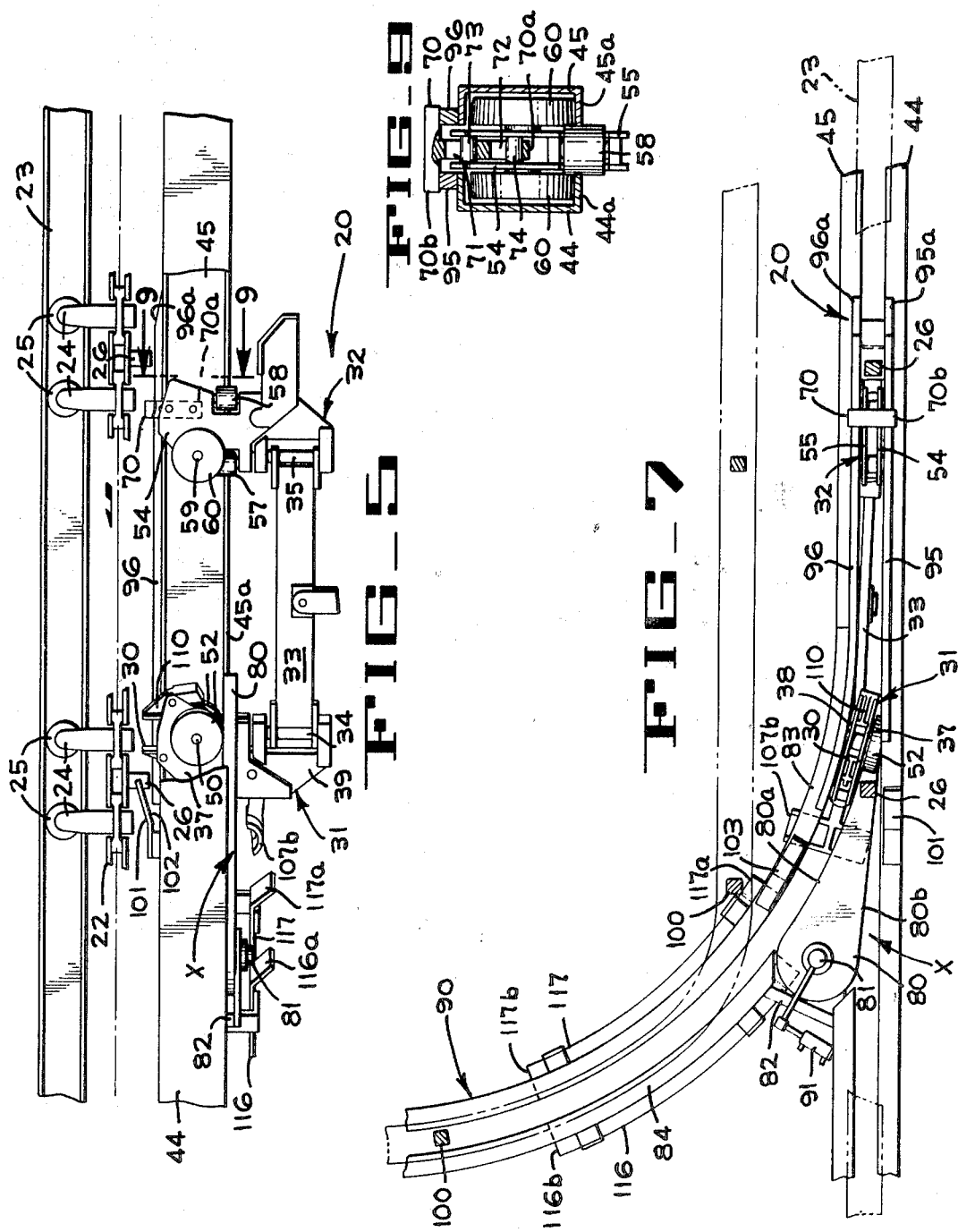

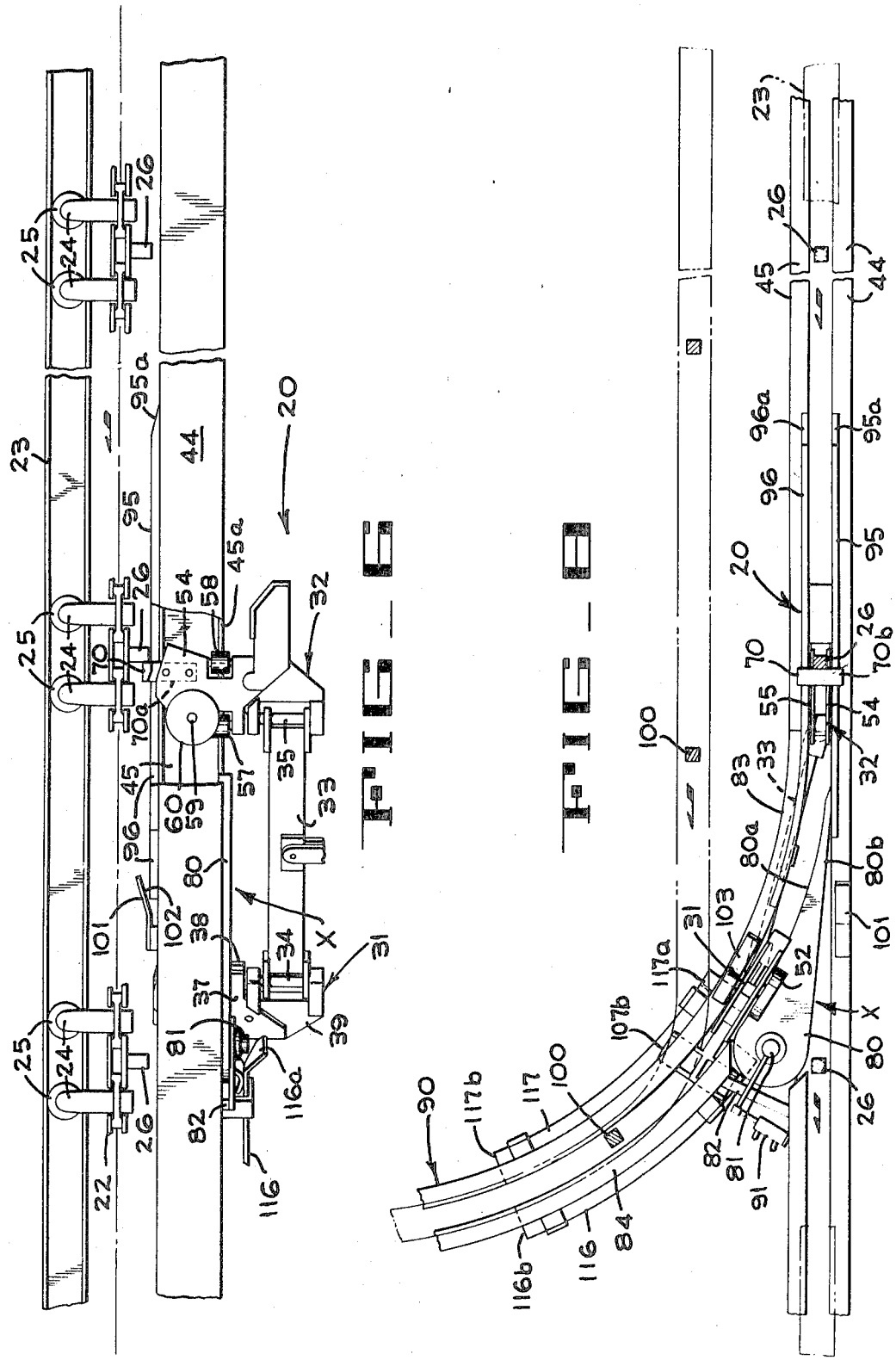

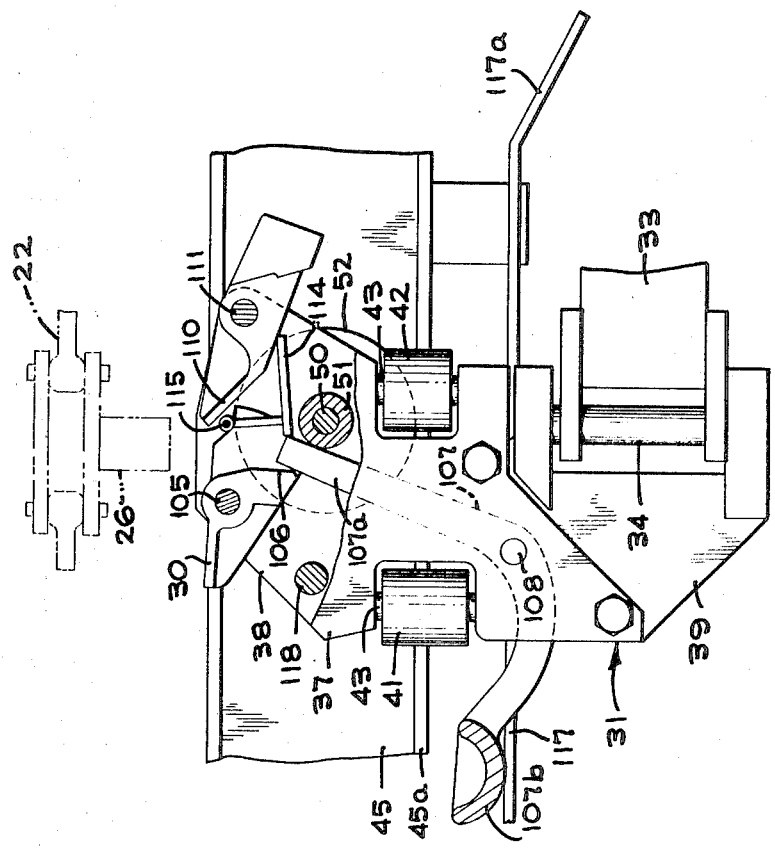
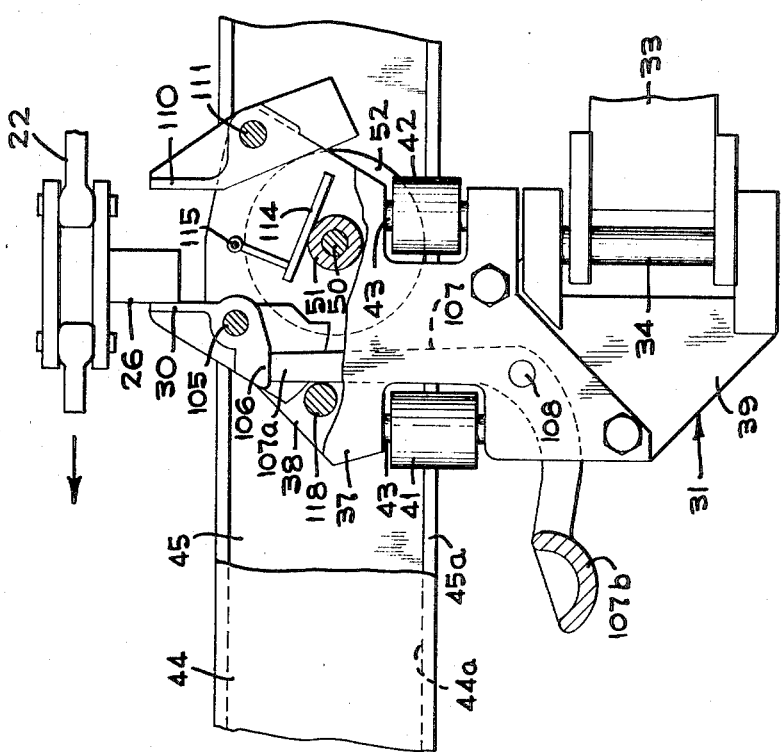

CONVEYING APPARATUS

BACKGROUND OF THE INVENTION

One type of trolley or carrier of a power and free conveyor system is provided with a pawl projecting upwardly at its forward end so that a pusher on a powered overhead chain can engage the pawl and propel it along the main conveyor line. When transferring such a trolley from a main line to a secondary storage or processing line, some means must be provided to propel the trolley from a first position at which the pusher on the main line chain moves out of contact with the pawl on the trolley to a second position at which the pawl is in the path of movement of a pusher on the powered chain of the secondary line. Means of moving the trolley from the first position to the second position have been provided in the past in the form of separately powered sweep arms and separately powered chains. Also, there has been used an arrangement wherein secondary pushers are provided on the powered chain of the main line. One of these pushers is spaced rearwardly from each primary pusher and is so constructed as to extend downwardly from the chain a shorter distance than the primary pusher. At each transfer station, the I-beam track, that carries the powered chain, is inclined downwardly so that the shorter secondary pusher will engage a pawl on the rear of any trolley that is temporarily stopped at the transfer station, due to the fact that the front of the trolley has been diverted into a secondary line out of contact with the primary pusher, and push the stalled trolley to the second position. U.S. Pats. No. 3,179,064, No. 3,222,645, No. 3,247,806 and No. 3,314,377 disclose transfer mechanisms of this general type. In the present invention, the problem is solved by providing a normally lowered dog on the rear portion of each trolley and means for raising the dog at the transfer station so that, when the trolley is temporarily stopped at the station, the next pusher on the main line chain will engage the raised dog and push the trolley onto the secondary conveyor line.

Accordingly, it is an object of the present invention to provide an improved mechanism for positively transferring a trolley from one conveyor line to another.

Another problem encountered when a trolley is moved from one powered line to a slower powered line arises due to the fact that pawls on the front end of the trolley may collide with one of the pushers of the overhead powered chain of the second, slower conveyor line as the trolley moves onto the second line. Certain trolleys have two upstanding pawls on their forward end, and U.S. Pat. No. 3,229,645 discloses the concept of making the rearward pawl lower than the forward pawl so that a pusher on the second line will not collide with the rear pawl. However, this arrangement does not solve the problem of the forward pawl being moved into engagement with a slower moving pusher on the secondary line. In the present invention, means is provided for lowering both the front and the rear pawl as the trolley moves onto the secondary line and subsequently allowing the pawls to return to operative position in the path of the pushers on the chain of the secondary line.

Accordingly, an object of this invention is to provide means for preventing jamming between a trolley and the power chain of a secondary conveyor line as the trolley is transferred onto said line.

SUMMARY OF THE INVENTION

The present invention relates to conveyors and, more particularly, to improvements in trolleys of a power and free conveying system of the type wherein the trolley has an upwardly projecting pawl at its forward end that is adapted to be engaged by a depending pusher of an overhead, powered chain. When the trolley of this type is diverted from the main line to a secondary line, the pawl at the front of the trolley moves out of engagement with the pusher at the front of the trolley, leaving the trolley momentarily stopped. A normally lowered dog is mounted on the rearward portion of the trolley, and cam means is provided alongside the path of movement at the transfer zone to engage and lift the dog to an elevated position. Then, if the forward end of the trolley has been diverted onto a secondary line, the next pusher of the powered chain of the main line will engage the raised pawl on the trolley and positively push the trolley off the main line and onto the secondary line.

It sometimes happens that the powered chain of the secondary line is traveling at a slower speed than the chain of the main line, and the upstanding pawls on the trolley may catch up with and bump into a pusher on the slower chain. In the present invention the trolley is provided with a forward, pivotally mounted drive pawl and a pivotally mounted backup pawl spaced a short distance rearwardly from the drive pawl. The backstop pawl is urged by gravity to an upright position while a lever is provided in the trolley for holding the drive pawl in upstanding position. Cam means are provided on the frame at the transfer zone for actuating the lever to permit the drive pawl to pivot downwardly by gravity. While releasing the drive pawl, the lever causes the backstop pawl to be swung downwardly. Thus, as the trolley moves onto the secondary line, both pawls are in a lowered position and cannot collide with a pusher of the chain of the secondary line.

DESCRIPTION OF THE DRAWINGS

FIG. 1 is a fragmentary diagrammatic side elevation, with parts broken away, showing a trolley constructed in accordance with the present invention as it approaches a transfer station of a power and free conveyor system.

FIG. 2 is a diagrammatic horizontal section taken on line 2—2 of FIG. 1, particularly showing the transfer station and the secondary conveyor line leading away from the main line.

FIG. 3 is an enlarged view of a portion of FIG. 1.

FIG. 4 is a vertical section taken on line 4—4 of FIG. 3.

FIGS. 5 and 6 are diagrammatic side elevations similar to FIG. 1 but showing the trolley at advanced stages as it moves through the transfer station onto the secondary line.

FIGS. 7 and 8 are plan views corresponding respectively to the elevational views of FIGS. 6 and 7.

FIG. 9 is a section taken on line 9—9 of FIG. 5.

FIG. 10 is a side elevation of the front portion of the trolley, showing a driving dog in engagement with the driving pawl.

FIG. 11 is a view similar to FIG. 10 but showing the driving pawl and the backup pawl in their deactivated positions.

DESCRIPTION OF A PREFERRED EMBODIMENT

In FIGS. 1 and 2, the reference numeral 20 indicates generally a trolley of the type used in a power and free conveying system which, in general, includes a powered chain 22 that is supported from an overhead I-beam 23 by spaced brackets 24. Each bracket is secured at its lower end to the chain and, at its upper end, it has two rollers 25, one roller being disposed on each side of the web of the I-beam in rolling engagement with the top surface of the lower flange of the I-beam. Pusher pins 26 are secured to the powered chain at spaced intervals and project downwardly therefrom to engage a drive pawl 30 carried at the forward end of each trolley and thus propel the trolley.

The trolley 20 comprises a forward carriage 31 and a trailing carriage 32 that are connected by a load-support bar 33 which is pivoted on pin 34 to carriage 31 and on pin 35 to carriage 32. Referring to FIG. 10, the forward carriage 31 comprises a pair of spaced vertical plates 37 and 38 that are secured together as by bolting to a base 39. Fore and aft guide rollers 41 and 42, respectively, are mounted for rotation about vertical pins 43 that are supported in blocks disposed between the plates 37 and 38, the pins 43 being positioned in the longitudinal central plane of the carriage. The guide rollers are disposed in a guide slot defined by the inner edges of the lower flanges 44a and 45a of two oppositely facing channels 44 and 45, respectively that support the trolleys and the load carried thereby.

A pin 50 extends transversely across the carriage and through a bushing 51 disposed between the sideplates 37 and 38. The shaft extends through the sideplates and, on the outer face of each sideplate, a roller 52 is mounted on the shaft for rolling engagement with the upper surface of one of the inturned lower flanges of the channels 44 and 45. Other details of the forward carriage 31 will be described hereinafter.

The trailing carriage 32 comprises a pair of vertical plates 54 and 55 (FIG. 3) that are secured together in spaced relation and cooperate to rotatably support a pair of fore and aft guide rollers 57 and 58 which travel in the slot defined by the lower flanges 44a and 45a of the channels. A pin 59, which extends transversely through the plates 54 and 55, is journaled for rotation and carries two rollers 60 (FIG. 4) that ride on the rails of the channels.

A T-shaped dog 70 (FIG. 4) has a vertical shank portion 70a, extending down between the plates 54 and 55, and a transverse top bar 70b that overlies the plates. A pair of aligned slots 71 and 72 (FIG. 3) are provided in the shank 70a to receive two pins 73 and 74 that extend between and are secured to the plates 54 and 55. Thus, it will be apparent in FIG. 3 that the dog 70 may be raised vertically upwardly until the bottom walls of the slots 71 and 72 engage the pins 73 and 74.

Referring to FIG. 2 it will be noted that the trolley 20 is approaching a transfer zone X at which a switchplate 80 is mounted for pivoting movement about a vertical post 81 that is supported on a fixed bracket 82. As seen in FIG. 1, the plate 80 has an upper portion disposed in the horizontal plane of the lower flanges 44a and 45a of the channels 44 and 45 that define the main conveyor line. It will be noted in FIG. 2 that the channel 45 is interrupted for a short distance at the transfer zone X to accommodate the switch plate 80, and to permit a curved channel 83 to be secured to channel 45 to form a continuation thereof. The curved channel 83 cooperates with a correspondingly curved channel 84 to define a shunt or secondary powered conveyor line 90. The switchplate is pivoted by a remotely controlled pneumatic power cylinder 91 and, when it is in the position shown in FIG. 2, the edge portion 80a of the switchplate cooperates with the lower ledge of the channel 83 to support the trolley as it moves into the shunt line. Similarly, when the switchplate is pivoted counterclockwise to the phantom line position, the edge portion 80b of the plate cooperates with the flange 44a to support the trolley as it moves straight through the transfer zone X on the main line.

As previously mentioned, when a trolley of this type is diverted off the main line, the pusher pin 26 on the main line power chain moves out of engagement with the drive pawl 30 of the trolley, as shown in FIG. 7. To prevent the stalling of the trolley when it is partially diverted, a pair of lift cams 95 and 96 are secured to the upper surface of the channels 44 and 45 adjacent the entry to the transfer station. As seen in FIGS. 5 and 7, the entrance ends 95a and 96a of the cams 95 and 96 respectively are disposed at a point on the channels 44 and 45 such that the cross bar 70b of the dog 70 engages the cams and is elevated before the pusher pin 26 of the main line moves out of contact with the front pawl of the trolley. Accordingly, when the pusher pin does lose contact with the trolley, the cross bar 70b is in the raised position of FIG. 5 and will be engaged by the next pusher pin 26 on the main line chain and pushed into a position on the secondary line where the drive pawl 30 of the trolley is in the path of a pusher 100 of the power chain of the secondary line.

Since the dog 70 must be lowered when the trolley leaves the transfer station, a cam plate 101 (FIGS. 1 and 2) is positioned on the upper surface of channel 44 and is provided with a downwardly inclined surface 102 arranged to engage the dog 70 and urge it to its lowered position. Cam 103 which is substantially identical to cam 101, is mounted on the channel 83 to lower the dog 70 if the trolley is diverted onto the shunt line.

Referring to FIG. 10, it will be seen that the drive pawl 30 is pivotally mounted on a pin 105 that extends between and is fixed to the sideplates 37 and 38. A ledge 106 is integrally formed on the pawl and has an undersurface arranged to be engaged by the end surface of an upwardly projecting arm 107a of an actuating bellcrank 107, that is pivoted on a pin 108, so that the pawl is held in the drive position of FIG. 10. The weight of the pawl is so distributed that, when the bellcrank 107 is swung clockwise to the position of FIG. 11, the pawl 30 will rotate by gravity to the nondriving position of FIG. 11. A backstop pawl 110 is pivotally mounted on a pin 111 that extends between the plates 37 and 38 rearwardly of the pawl 30. An intermediate lever 114 is pivotally mounted on a transverse pin 115 which is intermediate the pawls 30 and 110. When the actuating bellcrank 107 moves to the position of FIG. 11, it engages the intermediate lever 114 and swings it counterclockwise into engagement with the backstop pawl 110. Accordingly, the pawl 110 is swung counterclockwise to the lowered position of FIG. 11.

It is desirable that the pawls 30 and 110 be swung to their lowered position as the trolley moves onto the secondary line so that, if a pusher of the powered chain of the secondary line should be in the path of the forward end of the trolley, the pawls will pass thereunder without colliding with the pusher. In order to lower the pawls during this interval, two cam plates 116 and 117 (FIG. 2) are secured in fixed position along the secondary line, one on each side of the path of movement of the trolley. The plate 116 extends from its leading edge 116a to a trailing edge 116b, while plate 117 extends from edge 117a to edge 117b. The bellcrank 107 is provided at its forward end with a transverse bar 107b that has a rounded leading edge (FIG. 1) which is adapted to ride up the leading edges of the cam plates 116 and 117. The bar 107b also acts as a counterweight to urge the bellcrank 107 counterclockwise to a position wherein its upwardly projecting arm 107a abuts a fixed transverse stop pin 118.

The action of the bellcrank in effecting the lowering of the pawls 30 and 110 is illustrated in FIG. 11. In this view it is seen that the cam plates 116 and 117 (only the cam plate 117 being shown), which are in the same horizontal plane, are spaced below the channels 44 and 45. As the transverse bar 107b of bellcrank 107 rides up onto the cam plates 116 and 117, the bellcrank 107 is pivoted clockwise from its normal counterweighted position, releasing the ledge 106 of the drive pawl 30 to permit the pawl 30 to swing counterclockwise by gravity to its lowered position. During its pivoting movement, the bellcrank arm engages the intermediate lever 114 and swings it into engagement with the backstop pawl 110 to pivot that pawl to its lowered position.

The pawls 30 and 110 will remain in their lowered positions until the bar 107b of the bellcrank rides off the cam plates 116 and 117. When this occurs, the bellcrank swings counterclockwise to engage the ledge 106 and swing the drive pawl to drive position. When the bellcrank releases the intermediate lever 114, it swings by gravity to an at rest position against the bushing 51, permitting the backstop pawl 110 to swing clockwise by gravity to its raised position.

The downstream edges 116b and 117b of the cam plates are so located that the drive pawl 30 of the trolley will be allowed to move to its elevated position before the pusher 26 on the main line chain moves out of engagement with the raised dog 70 on the trolley. Thus, when the transferring movement of the trolley under the control of the main chain terminates, the drive pawl is disposed in the path of a pusher on the powered chain of the secondary line. As the powered pusher 100 of the secondary line overtakes the forward carriage 31, the backstop pawl 110 will be pivoted in a counterclockwise direction by the pusher 100 to allow the pusher 100 to engage the drive pawl 30 thereby driving the trolley 20 along the secondary line.

From the foregoing discussion it will be apparent that the elevatable dog 70 and the cam strips 95 and 96 provide an efficient mechanism for assuring that a trolley is moved through a transfer station of a power and free conveyor. Further, the bellcrank 107, the cam plates 116 and 117, and the intermediate lever 114 of the trolley are particularly adapted to assure that the drive pawl and backstop pawl of the trolley are in a lowered position out of the path of possible collision with the power chain of the secondary line.

Although the best mode contemplated for carrying out the present invention has been herein shown and described, it will be apparent that modification and variation may be made without departing from what is regarded to be the subject matter of the invention.

I claim:

1. In a trolley of the type having a drive pawl near its forward end, a second pawl rearwardly of said drive pawl, and means mounting said pawls on said trolley for pivotal movement from a lowered position wherein all portions of said pawls are below a predetermined level to a raised position, the improvement which comprises means for holding said pawls in the raised position, and means for effecting the movement of both of said pawls to lowered position, said means for holding said second pawl in raised position comprising a weighted portion of said pawl, and said means for holding said drive pawl in raised position comprising a lever having an end portion engageable with said drive pawl for moving said drive pawl to raised position and locking it in said position, said lever effective to cause positive engagement with said second pawl to urge it to lowered position.

2. In a trolley of the type having a drive pawl near its forward end, a second pawl rearwardly of said drive pawl, and means mounting said pawls on said trolley for pivotal movement from a lowered position wherein all portions of said pawls are below a predetermined level to a raised position, the improvement which comprises means for holding said pawls in the raised position, and means for effecting the movement of both of said pawls to lowered position, said means for holding said pawls in raised position including a first lever mounted for engagement with said second pawl for pivoting it to lowered position and a second lever that is movable into engagement with said pawl-engaging lever to actuate said pawl-engaging lever into pawl-lowering contact with said pawl.

3. In combination, a conveyor track, a trolley movable along said track and having a drive pawl near its forward end and a second pawl rearwardly of said drive pawl, said drive pawl being pivoted on said trolley for gravity movement to a lowered position and said second pawl being pivoted on said trolley for movement to a raised position, a lever pivotally mounted on said trolley for movement from a first position in engagement with said drive pawl for locking said pawl in raised position to a second position in operative engagement with said second pawl for holding said second pawl in lowered position, and actuating means for moving said lever between first and second positions, said actuating means including a weighted portion carried by said lever for urging said lever from said second to said first position.

4. In combination, a conveyor track, a trolley movable along said track and having a drive pawl near its forward end and a second pawl rearwardly of said drive pawl, said drive pawl being pivoted on said trolley for gravity movement to a lowered position and said second pawl being pivoted on said trolley for movement to a raised position, a first lever pivotally mounted on said trolley for movement from a first position in engagement with said drive pawl for locking said pawl in raised position to a second position for releasing the pawl to said lowered position, a second lever pivotally mounted on said trolley for movement into operative engagement with said second pawl for holding said second pawl in lowered position on movement of said first lever into said second position, and actuating means for moving said first lever between said first and second positions.

5. The combination of claim 4 wherein said actuating means includes cam means mounted in fixed position along said track to engage and move said lever from said first to said second position.

6. The combination of claim 4 wherein said actuating means includes a weighted portion carried by said lever for urging said lever from said second to said first position.

7. In a trolley of the type having a drive pawl near its forward end, a second pawl rearwardly of said drive pawl, and means mounting said pawls on said trolley for pivotal movement from a lowered position wherein all portions of said pawls are below a predetermined level to a raised position, the improvement which comprises means for holding said pawls in the raised position including a first lever pivotally mounted on the trolley and movable with respect to the drive pawl to engage the drive pawl, and means for effecting the movement of both of said pawls to lowered position including a second lever pivotally mounted on the trolley in the path of said first lever for engagement thereby for lowering of said pawls simultaneously.

8. A conveyor system having a main line and having a shunt line branching off the main line at a transfer zone, said system having pusher means movable along a path adjacent the main line and having pusher means movable along a path adjacent the shunt line, said paths spaced apart in the transfer zone, a trolley movable along said lines and having a drive pawl on the trolley, said trolley having a second pawl rearward of said drive pawl, said drive pawl being pivoted on said trolley for gravity movement to a lowered position and said second pawl being pivoted on said trolley for movement normally to a raised position, a lever pivotally mounted on said trolley for movement from a first position to a second position, said lever operable in said first position to hold said drive pawl in the raised position and operable in the second position to hold said second pawl in the lowered position, and actuating means operable in response to movement of the trolley through the transfer zone to shift said lever to said second position whereby both pawls are held beyond the reach of the pusher means for the shunt line.